US 12,194,837 B2

(12) United States Patent
Gambone et al.

(10) Patent No.: US 12,194,837 B2
(45) Date of Patent: Jan. 14, 2025

(54) INTEGRATED FUEL STORAGE SYSTEM

(71) Applicant: Nikola Corporation, Phoenix, AZ (US)

(72) Inventors: Livio Richard Gambone, Phoenix, AZ (US); Alexander Waldemar Grab, Phoenix, AZ (US); David Leigh Grottenthaler, Phoenix, AZ (US); Paul Benjamin Reidhead, Gilbert, AZ (US); Jesse Michael Schneider, Chandler, AZ (US)

(73) Assignee: Nikola Corporation, Phoenix, AZ (US)

( * ) Notice: Subject to any disclaimer, the term of this patent is extended or adjusted under 35 U.S.C. 154(b) by 727 days.

(21) Appl. No.: 17/317,813

(22) Filed: May 11, 2021

(65) Prior Publication Data

US 2021/0260994 A1    Aug. 26, 2021

Related U.S. Application Data

(63) Continuation of application No. PCT/US2020/061240, filed on Nov. 19, 2020.
(Continued)

(51) Int. Cl.
*B60K 15/07* (2006.01)
*B60K 15/03* (2006.01)
*B60K 15/063* (2006.01)

(52) U.S. Cl.
CPC .... *B60K 15/07* (2013.01); *B60K 2015/03151* (2013.01); *B60K 2015/0634* (2013.01); *B60Y 2306/01* (2013.01)

(58) Field of Classification Search
CPC ............... B60Y 2306/01; B60K 15/07; B60K 2015/03151; B60K 2015/0634;
(Continued)

(56) References Cited

U.S. PATENT DOCUMENTS 10,906,395 B2 *  2/2021  Gibb .................... F17C 1/00
2004/0060750 A1    4/2004  Chernoff et al.
(Continued)

FOREIGN PATENT DOCUMENTS

WO    2017/145058    8/2017

OTHER PUBLICATIONS

EPO; Extended European Search Report dated Sep. 3, 2021 in EP Application No. 20880383.3.
(Continued)

*Primary Examiner* — Christopher B Wehrly
(74) *Attorney, Agent, or Firm* — Snell & Wilmer L.L.P.

(57) ABSTRACT

A pressure vessel mounting system for mounting a pressure vessel to a vehicle chassis is disclosed. In various embodiments, the system includes a first end frame; a second end frame spaced a distance from the first end frame, the distance being sufficient to receive a pressure vessel between the first end frame and the second end frame; a first side frame extending between the first end frame and the second end frame, the first side frame configured for coupling to a first chassis rail of the vehicle chassis via at least one of the first end frame and the second end frame; and a second side frame extending between the first end frame and the second end frame. Via use of the pressure vessel mounting system, impact damage to pressure vessels may be reduced and/or eliminated.

15 Claims, 11 Drawing Sheets

Related U.S. Application Data

(60) Provisional application No. 62/948,520, filed on Dec. 16, 2019.

(58) Field of Classification Search
CPC ........... B60K 2015/0675; F17C 13/084; F17C 2201/0109; F17C 2205/0103; F17C 2205/01; F17C 2205/0305; F17C 2221/012
USPC ......................................................... 280/830
See application file for complete search history.

(56) References Cited

U.S. PATENT DOCUMENTS

| | | | |
|---|---|---|---|
| 2005/0161267 A1 | 7/2005 | Elson et al. | |
| 2006/0061081 A1* | 3/2006 | Kresse, Jr. | B60K 15/07 280/834 |
| 2014/0117716 A1 | 5/2014 | Patberg et al. | |
| 2016/0082910 A1* | 3/2016 | Sloan | B60R 19/023 293/128 |
| 2017/0282710 A1* | 10/2017 | Sloan | F17C 13/084 |
| 2018/0093563 A1 | 4/2018 | Matijevich et al. | |
| 2019/0263450 A1 | 8/2019 | Inoue et al. | |
| 2022/0105799 A1* | 4/2022 | Bochicchio De Maria | B60K 15/07 |
| 2022/0266685 A1* | 8/2022 | Godard | F17C 13/084 |

OTHER PUBLICATIONS

CIPO, Restriction Requirement dated Jul. 27, 2023 in CA Serial No. 3161587.

ISA; International Search Report and Written Opinion dated Mar. 25, 2021 in Application No. PCT/US2020/061240.

* cited by examiner

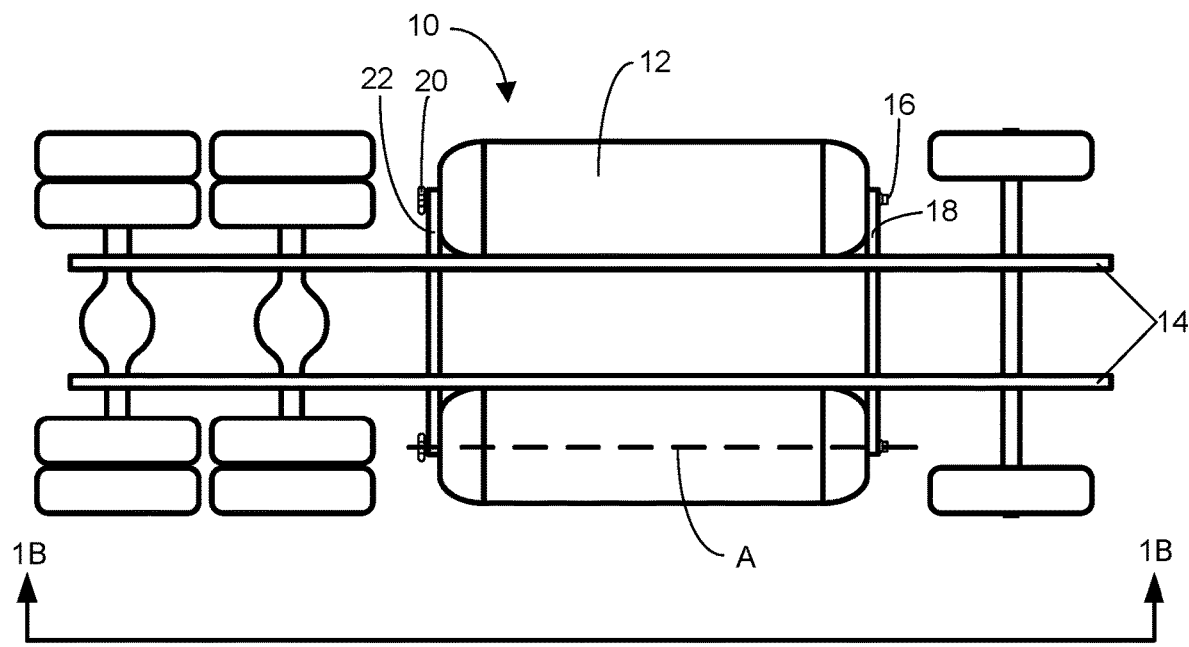
Prior Art     Fig. 1A
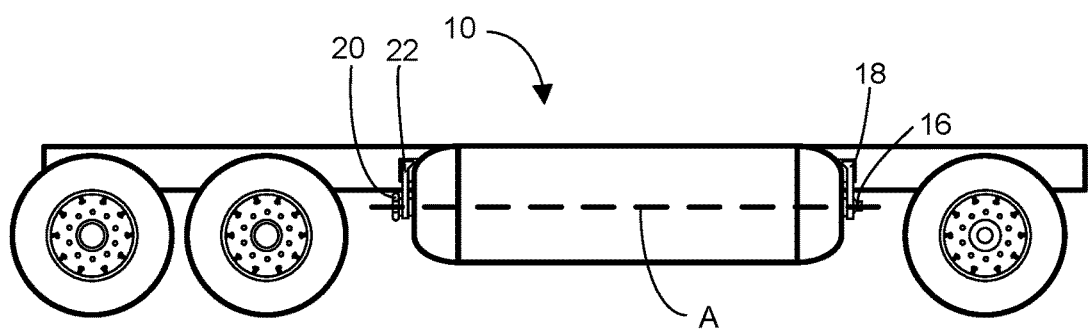
Prior Art     Fig. 1B

INTEGRATED FUEL STORAGE SYSTEM

CROSS-REFERENCE TO RELATED APPLICATIONS

This application is a continuation of PCT Patent Application Serial No. PCT/US2020/061240 filed Nov. 19, 2020 and entitled INTEGRATED FUEL STORAGE SYSTEM. PCT/US2020/061240 claims priority to and the benefit of U.S. Provisional Patent Application No. 62/948,520 filed on Dec. 16, 2019 and entitled INTEGRATED FUEL STORAGE SYSTEM. The contents of each of the foregoing applications are hereby incorporated by reference (except for any subject matter disclaimers or disavowals, and except to the extent of any conflict with the disclosure of the present application, in which case the disclosure of the present application shall control).

TECHNICAL FIELD

The present disclosure relates generally to gaseous fuel storage vessels and, more particularly, to methods and apparatus used to integrate gaseous fuel storage vessels into vehicle chassis in order to withstand impact loads.

BACKGROUND

Carbon fiber reinforced composites offer light weight, corrosion resistance, high strength to weight ratios, and excellent tension and bending fatigue performance and are utilized in numerous structural applications. For example, these materials may be used as a structural reinforcing element in composite wrapped (Type III & IV) gaseous pressure vessels for the onboard storage of hydrogen fuel in fuel cell electric vehicles (FCEV) at pressures on the order of 70 MPa ($\approx$10,000 psi). Notwithstanding excellent strength characteristics, composite pressure vessels may be susceptible to damage and failure, for example when impacted during a vehicle crash. Accordingly, improved pressure vessels and/or improved systems and methods for coupling, retaining, and/or absorbing impacts in connection with such vessels remain desirable.

SUMMARY

A pressure vessel mounting system is disclosed. In an exemplary embodiment, a pressure vessel mounting system for mounting a pressure vessel to a vehicle chassis comprises a first end frame; a second end frame spaced a distance from the first end frame, the distance being sufficient to receive a pressure vessel between the first end frame and the second end frame; a first side frame extending between the first end frame and the second end frame, the first side frame configured for coupling to a first chassis rail of the vehicle chassis via at least one of the first end frame and the second end frame; and a second side frame extending between the first end frame and the second end frame.

In another exemplary embodiment, a dome-mount system for a pressure vessel comprises an attachment collar configured for mounting to a frame of a pressure vessel mounting system; and a vessel mount, the vessel mount including a plurality of studs configured to slidably engage the attachment collar.

In yet another exemplary embodiment, a system configured to mount a pressure vessel to a vehicle chassis comprises a first end frame element configured to connect a first side frame to a first chassis rail of the vehicle chassis; and a first impact dissipator configured for disposition between the first end frame element and the first side frame.

The forgoing features and elements may be combined in any combination, without exclusivity, unless expressly indicated herein otherwise. These features and elements as well as the operation of the disclosed embodiments will become more apparent in light of the following description and accompanying drawings. The contents of this section are intended as a simplified instruction to the disclosure, and are not intended to be used to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 1A and 1B illustrate prior art approaches for a pressure vessel mounting system on a vehicle frame with a neck mounting system;

DETAILED DESCRIPTION

Figure 1C:
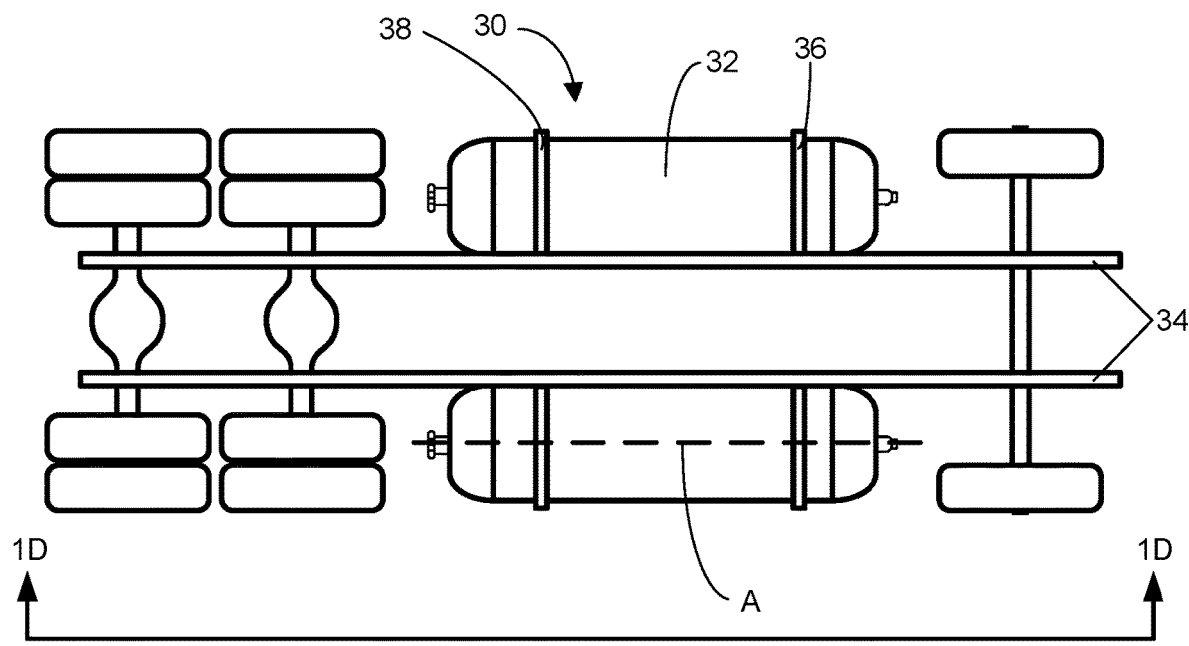
FIGS. 1C and 1D illustrate prior art approaches for a pressure vessel mounting system on a vehicle frame with a strap mounting system, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to "singular" includes plural embodiments, and any reference to "more than one" component or step may include a singular embodiment or step. Also, any reference to "attached", "fixed", "connected", or the like may include permanent, removable, temporary, partial, full or any other possible attachment option. Additionally, any reference to "without contact" (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

For the sake of brevity, conventional approaches for pressure vessel construction, mounting, retention, use, and/or the like may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical system and/or related methods of use, for example an integrated fuel system associated with a fuel cell electric vehicle.

Regarding pressure vessels, Type III and IV pressure vessels are the classifications most typically used in automotive or aerospace applications. See, e.g., 49 C.F.R. § 571.304 (describing standards for fuel container integrity). A primary constituent of these pressure vessels is the composite overwrap, which provides nearly all the structural integrity of the vessel, particularly at higher pressures. The composite overwrap is wound over a metallic liner for Type III vessels and a non-metallic liner for Type IV vessels. The liners, either metallic or non-metallic, typically act as a gas barrier and a mandrel for the composite overwrap. Traditionally, the most cost-effective means of producing a Type III or IV pressure vessel is by a process called filament winding. In a wet filament winding application, carbon or glass fiber or some other fiber is pulled through a wet-out bath whereby the fiber is impregnated with an epoxy resin or with a thermoset or thermoplastic resin. Pluralities of hoop wraps and helical wraps of the fiber are then wound onto the liner. Following the conclusion of the filament winding process, the pressure vessel is then cured to harden the composite laminate (or overwrap). The pressure vessel is then typically tested for quality and confirmation of performance characteristics.

Gas containment of the composite overwrapped pressure vessel is a primary performance characteristic. In Type III pressure vessels, one or more ports (e.g., a gas inlet and a gas outlet) typically comprise a boss formed in the metallic liner. In Type IV pressure vessels, a boss is typically attached to the non-metallic liner. In both applications, the boss may comprise a threaded orifice that provides an interface with which to thread a valve or an end plug, sealing the pressure vessel from leaks and providing access to an interior of the pressure vessel for filling or removing gaseous fluid under pressure. Additionally, in both applications, low-angle helical layers of fiber, which are defined by the angular deviation from the cylindrical axis of the pressure vessel, are built up on the dome region during filament winding to provide sufficient strength to avoid blowouts of the boss at maximum or otherwise high interior pressure.

Figure 1D:
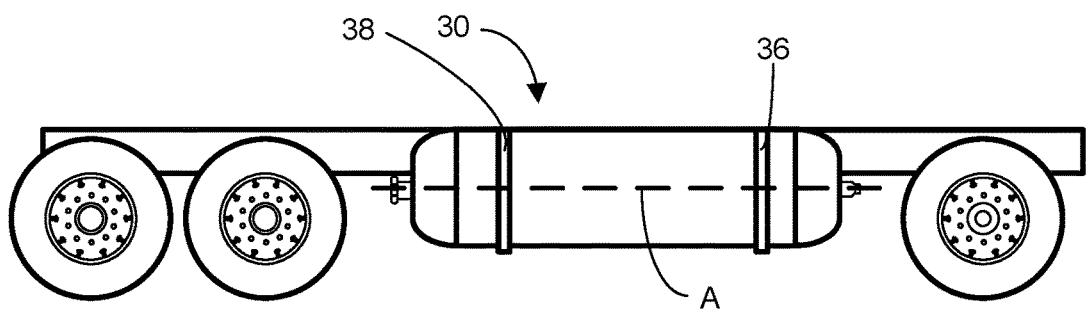

Type III and IV pressure vessels may be exposed to various loads and loading scenarios depending on mounting methods. Conventional mountings of pressure vessels in the alternative fuel industry are typically accomplished by one of two methods: a strap mount or a neck mount. See, e.g., FIGS. 1A, 1B (neck mount); FIGS. 1C, 1D (strap mount). In a neck mount application, a first boss is typically fixed, while a second boss is allowed to slide in a neck block, allowing for expansion and contraction of the pressure vessel due to pressure and temperature changes. In a strap mount application, two or more strap mounts are attached to a frame and configured to secure an exterior surface of the pressure vessel to the frame. Regardless of the method of mounting, the integrity of the composite pressure vessel subjected to impact loads is of concern. These loads (e.g., axial, hoop or radial), typically introduced in crash scenarios, may result in deformation, leakage or rupture of the pressure vessel. Composite pressure vessels typically undergo stringent qualification testing to mitigate these failure scenarios in the form of drop and penetration testing. Despite such testing, however, composite pressure vessels may still fail occasionally in service due to impact loads suffered during crash scenarios.

Referring now to the drawings, FIGS. 1A and 1B schematically illustrate a pressure vessel mounting system 10, whereby a pressure vessel 12 is mounted to a vehicle chassis 14. The pressure vessel mounting system 10 is of a conventional type and includes a neck mount configuration, whereby a first boss 16 is slidably mounted to a first neck mount 18 and a second boss 20 is fixedly mounted to a second neck mount 22. Slidably mounting the first boss 16 to the first neck mount 18 permits expansion of the pressure vessel 12 in an axial direction with respect to an axial centerline A extending through the pressure vessel 12. In various embodiments, both the first neck mount 18 and the second neck mount 22 are fixedly attached or otherwise connected to the vehicle chassis 14. Similarly, FIGS. 1C and 1D schematically illustrate a pressure vessel mounting system 30, whereby a pressure vessel 32 is mounted to a vehicle chassis 34. The pressure vessel mounting system 30 is of a conventional type and includes a strap mount configuration, whereby a first strap 36 surrounds the pressure vessel 32 and is fixedly mounted or otherwise connected to the vehicle chassis 34 and a second strap 38 surrounds the pressure vessel 32 and is fixedly mounted or otherwise connected to the vehicle chassis 34. For both the pressure vessel mounting system 10 and the pressure vessel mounting system 30, minimal additional framing is necessary to retain the corresponding pressure vessels to the corresponding vehicle chassis. Drawbacks to these configurations or mounting systems, include, however: (i) the pressure vessels do not contribute in meaningful ways to the stiffness or rigidity of the vehicle chassis; and (ii) the pressure vessels are substantially exposed to side impacts, which may result in substantial damage to the pressure vessels, including rupture, during a crash scenario, either with another vehicle or with a roadside object or a permanent structure.

To address these and other issues, principles of the present disclosure contemplate integrating a structural carriage within the chassis of a vehicle to support and carry one or more pressure vessels and to protect the one or more pressure vessels from damage or rupture during an impact event—e.g., a vehicular collision. In various embodiments, for example, the structural carriage is constructed using components or framing configured to deform during the impact event and to dissipate energy in a controlled and distributed fashion such that an impact load is not concentrated on a particular location of the one or more pressure vessels but, rather, is spread throughout the structural carriage and, in various embodiments, throughout the one or more pressure vessels in addition to the structural carriage. In various embodiments, for example, the structural carriage, or some or all the components that comprise the structural carriage, is constructed of energy absorbing materials exhibiting high stiffness values (k-values) configured to permanently deform and partially or completely absorb the energy imparted to a vehicle during a collision. The energy absorbing materials may, for example, be aluminum honeycomb, extruded aluminum, bent sheet metal, fluid filled elastomeric element or any number of suitable high k-value materials.

Figure 2A:
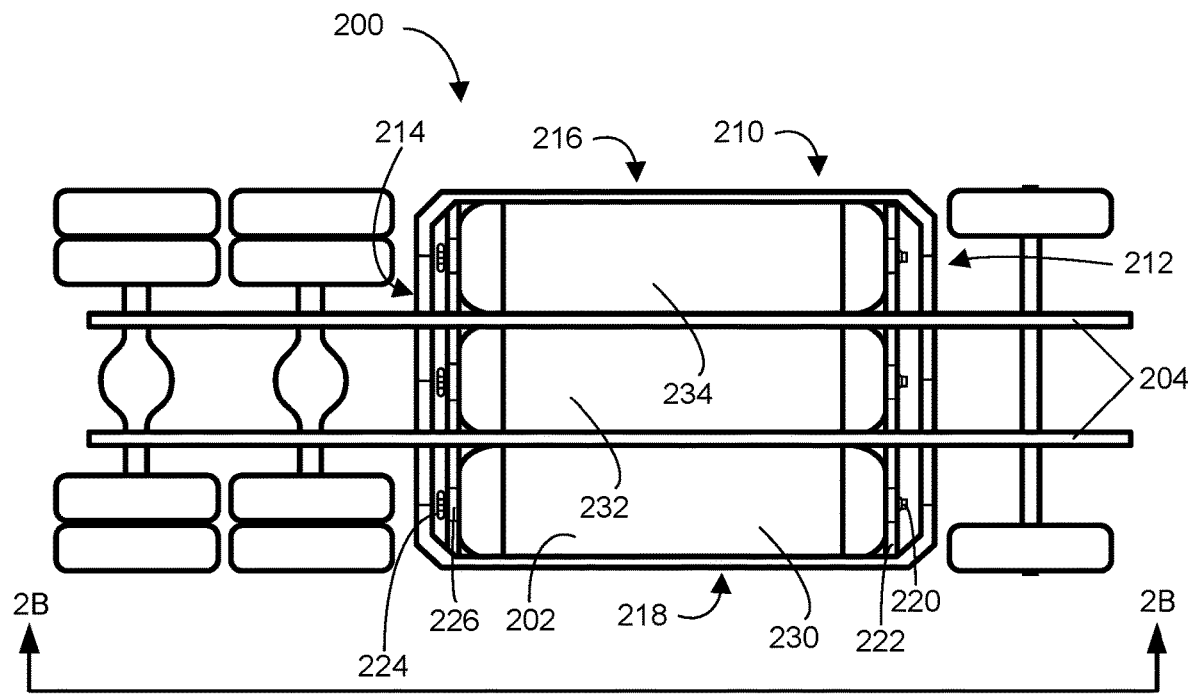
FIGS. 2A and 2B provide overhead and side views of a pressure vessel mounting system integrated within a vehicle frame, in accordance with various embodiments.
Figure 2B:
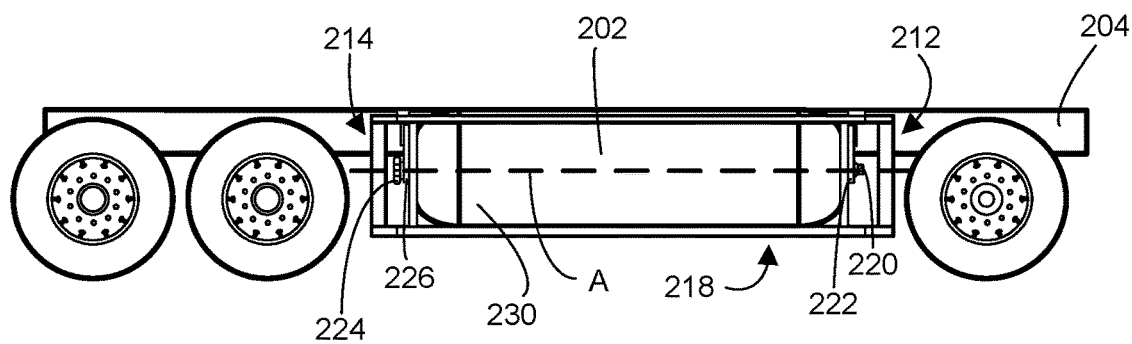

Referring now to FIGS. 2A and 2B, overhead and side views of a pressure vessel mounting system 200, whereby a pressure vessel 202 is mounted to a vehicle chassis 204, are illustrated, in accordance with various embodiments and with respect to an XYZ coordinate system. The pressure vessel mounting system 200 includes a structural carriage 210 configured for mounting to the vehicle chassis 204 and absorbing energy through controlled deformation upon impact. In various embodiments, the structural carriage 210 includes a first end frame 212 (or a front frame), a second end frame 214 (or a rear frame) spaced a longitudinal distance in the X-direction from the first end frame 212, a first side frame 216 (or a left side frame) and a second side frame 218 (or a right side frame) spaced a transverse distance along the Y-direction from the first side frame 216. As described in further detail below, each of the first end frame 212, the second end frame 214, the first side frame 216 and the second side frame 218 may comprise one or more structural members—e.g., tubes or beams of various cross section and material selection-secured together by bolts, welds or other techniques to form the structural carriage 210. Further, while the structural carriage 210 is configured to carry the pressure vessel 202 and secure the same to the vehicle chassis 204, in various embodiments, the structural carriage 210 may comprise one or more components of the vehicle chassis 204 itself, in addition to one or more of the first end frame 212, the second end frame 214, the first side frame 216 and the second side frame 218.

Still referring to FIGS. 2A and 2B, in various embodiments the pressure vessel 202 is mounted to the structural carriage 210 via a neck mount configuration, whereby a first boss 220 is slidably mounted to a first neck mount 222 (or a front neck mount) and a second boss 224 is fixedly mounted to a second neck mount 226 (or a rear neck mount). Slidably mounting the first boss 220 to the first neck mount 222 permits expansion of the pressure vessel 202 in an axial direction with respect to an axial centerline A extending through the pressure vessel 202. In various embodiments, the first neck mount 222 is mounted to or comprised within the first end frame 212 and the second neck mount is 226 is mounted to or comprised within the second end frame 214. While the first neck mount 222 and the second neck mount 226 are described above as securing or otherwise coupling the pressure vessel 202 (e.g., a first pressure vessel 230) to the structural carriage 210, it will be appreciated that similarly configured first and second neck mounts may be mounted to or comprised within the structural carriage 210 and configured to secure or otherwise couple any number of other pressure vessels to the structural carriage 210, including, for example, a second pressure vessel 232 and a third pressure vessel 234.

With reference to the foregoing and to the following discussion, in various embodiments, a nondestructive monitoring system may be attached to the pressure vessel 202 (or to one or more of a plurality of pressure vessels) to monitor the structural integrity of the composite laminate of the pressure vessel 202. The nondestructive monitoring technique may comprise, for example, modal acoustic emission sensors, ultrasonic sensors, strain gauges or similar devices integrated into the composite laminate to allow for real-time diagnostic monitoring of the structural condition of the laminate. Damage accumulation in structural composite materials may result from cumulative progression of composite resin matrix cracking, delamination between composite layers and fiber breakage. Each of these cumulative damage mechanisms exhibit unique "acoustic" signatures that can be processed and analyzed to predict impending failure. In conjunction with a pressure vessel pressure monitoring system, or in the absence of same, the nondestructive monitoring technique may also be employed to count fueling cycles, which are critical to defining the vessel end of life and removal from service. In various embodiments, such a nondestructive monitoring system is configured to send data and messages to a tank control unit, which may then send messages via a controller area network or other communications medium to a human machine interface indicating the health of the pressure vessel 202. Furthermore, the human machine interface may be configured to communicate directly with a fueling station dispenser to abort a fueling process.

Figure 3A:
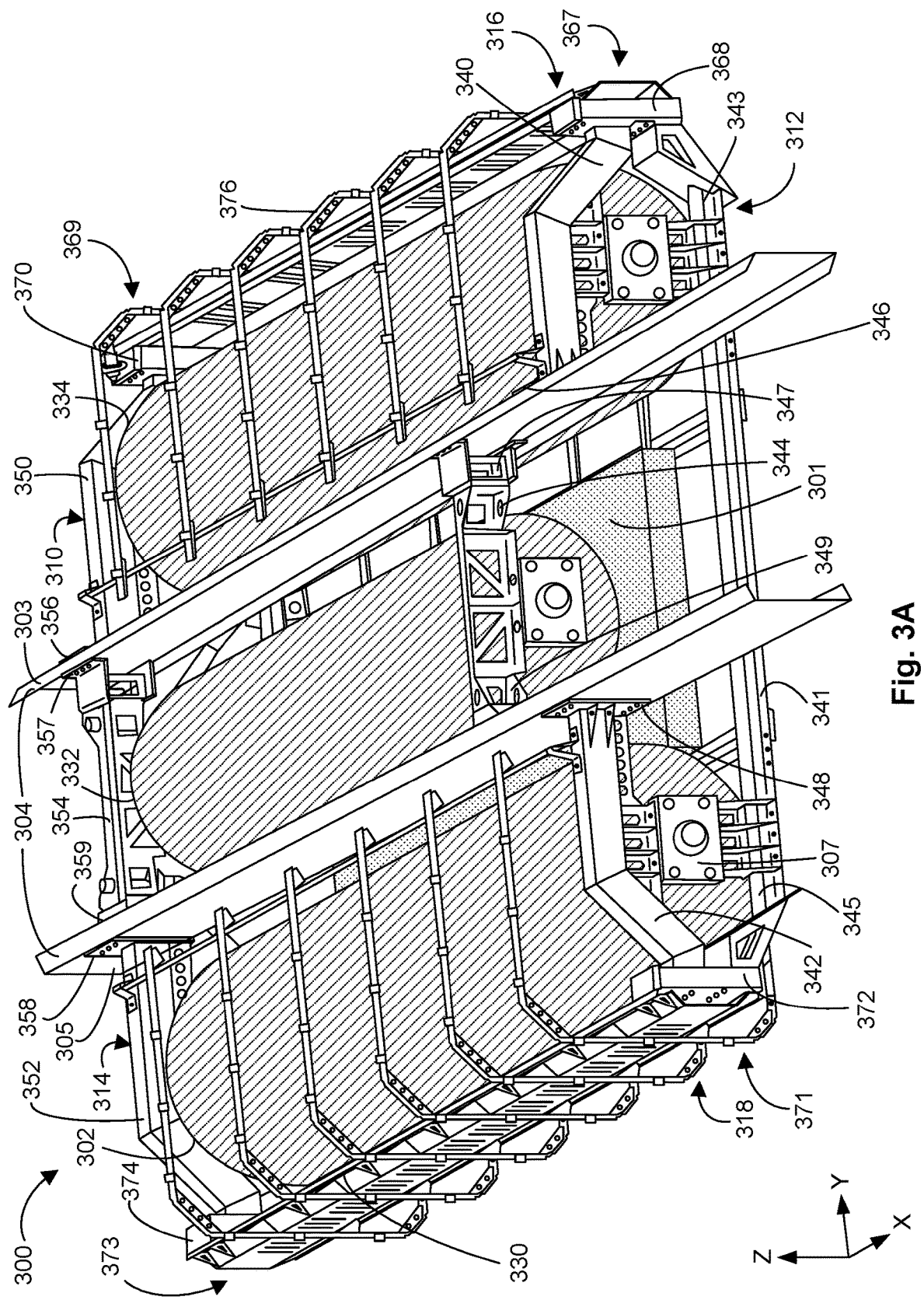
FIGS. 3A and 3B provide front and rear perspective views of a pressure vessel mounting system integrated within a vehicle frame, in accordance with various embodiments.
Figure 3B:
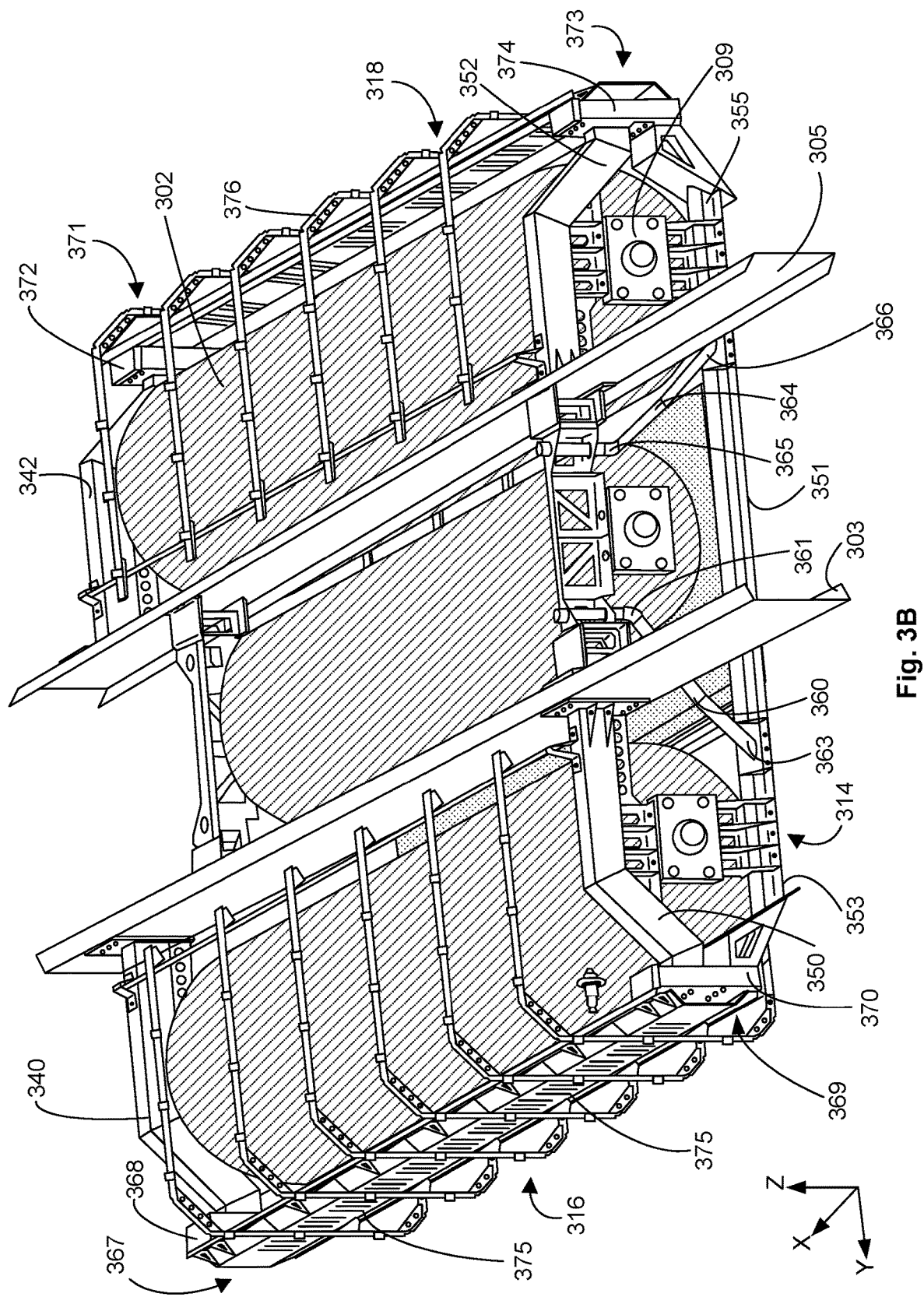
Figure 4A:
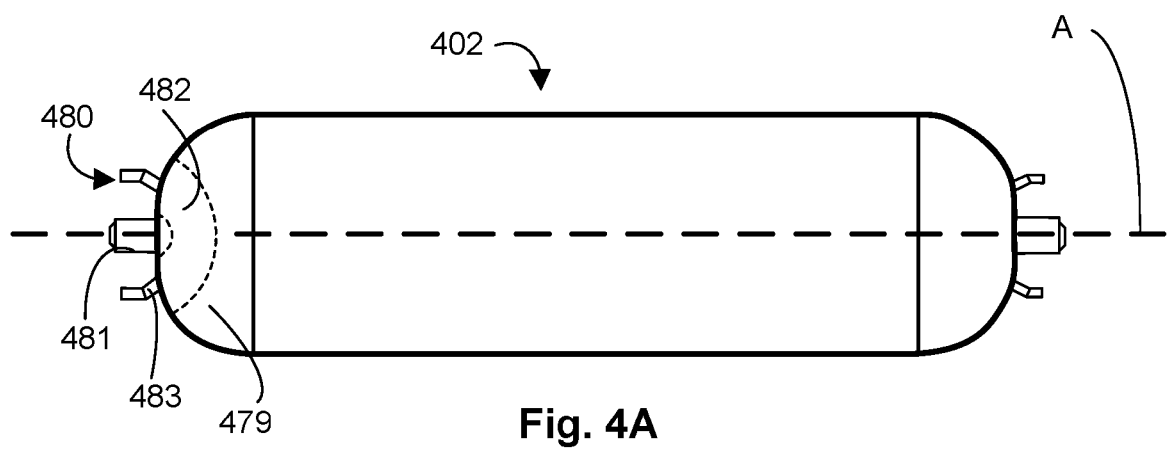
FIGS. 4A, 4B, 4C, 4D and 4E illustrate a mounting system configured to secure a vessel mount to a dome section of a pressure vessel, in accordance with various embodiments.
Figure 4B:
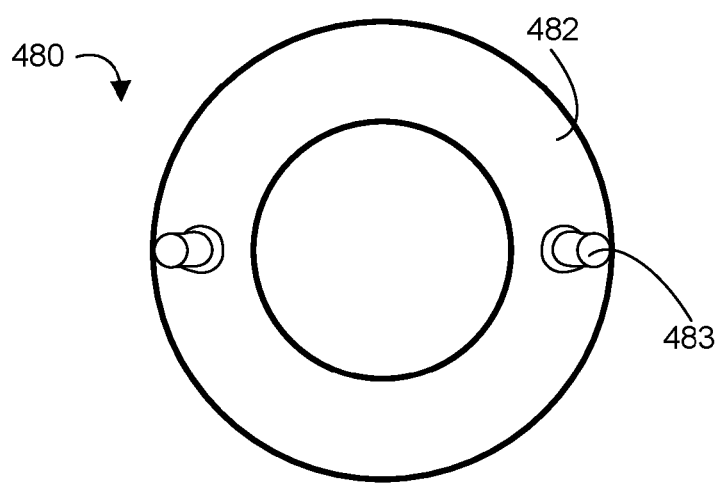
Figure 4C:
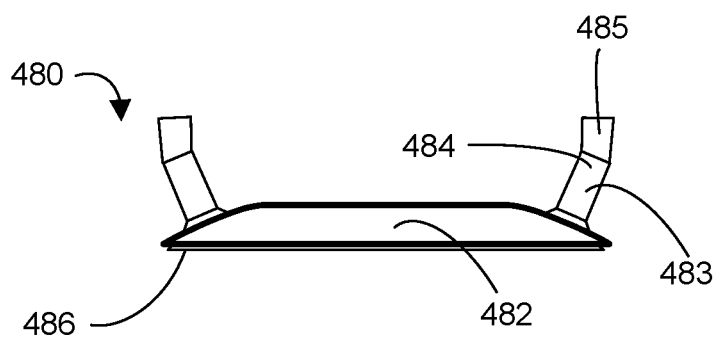
Figure 4D:
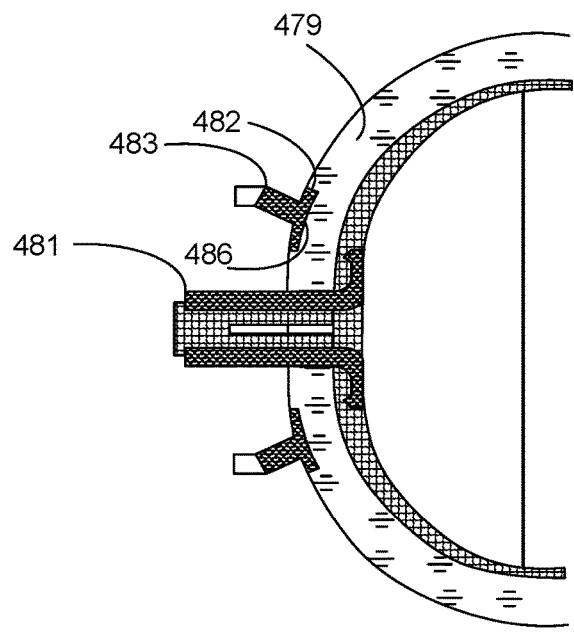
Figure 4E:
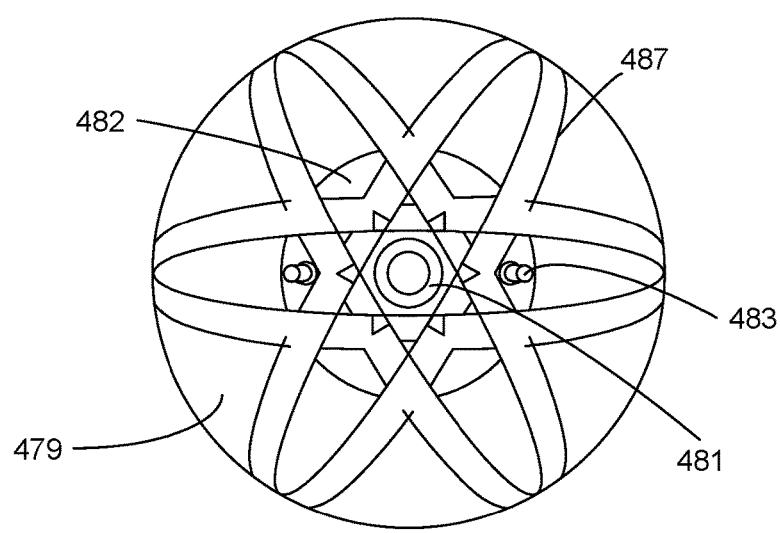

Referring now to FIGS. 3A and 3B, in accordance with certain embodiments, various structural details of a pressure vessel mounting system 300 are illustrated. Similar to the pressure vessel mounting system 200 described above with reference to FIGS. 2A and 2B, the pressure vessel mounting system 300 is configured to carry a pressure vessel 302 or, without loss of generality, a plurality of pressure vessels, which may include, for example, a first pressure vessel 330, a second pressure vessel 332 and a third pressure vessel 334. Again, without loss of generality, the second pressure vessel 332 may, in various embodiments, be positioned adjacent to, including being positioned above, a battery 301; further, in various embodiments, the diameter or length of the second pressure vessel 332 may be smaller than those of its neighbors to accommodate other structures, including, for example, the battery 301. In accordance with various embodiments and with respect to an XYZ coordinate system, the pressure vessel mounting system 300 includes a structural carriage 310 configured for mounting to a vehicle chassis 304 and absorbing energy through controlled deformation upon impact. In various embodiments, the structural carriage 310 includes a first end frame 312 (or a front frame), a second end frame 314 (or a rear frame) spaced a longitudinal distance in the X-direction from the first end frame 312, a first side frame 316 (or a left side frame) and a second side frame 318 (or a right side frame) spaced a transverse distance along the Y-direction from the first side frame 316. Each of the first end frame 312, the second end frame 314, the first side frame 316 and the second side frame 318 comprise one or more structural members—e.g., tubes or beams of various cross section and material selection-secured together by bolts, welds or other techniques to form the structural carriage 310. Further, while the structural carriage 310 is configured to carry the pressure vessel 302 (or a plurality of pressure vessels) and secure the same to the vehicle chassis 304, in various embodiments, the structural carriage 310 may comprise one or more components of the vehicle chassis 304 itself, such as, for example, a first chassis rail 303 or a second chassis rail 305, in addition to one or more of the first end frame 312, the second end frame 314, the first side frame 316 and the second side frame 318. As described in further detail below, the pressure vessel 302 is secured to the first end frame 312 via a first attachment collar 307 and to the second end frame 314 via a second attachment collar 309. Similar vessel attachments are used to attach the other pressure vessels to the end frames.

Referring still to FIGS. 3A and 3B, each of the first end frame 312 and the second end frame 314 may include one or more frame elements (e.g., tubes or beams) configured for connection to the vehicle chassis 304. For example, the first end frame 312 may include a first end frame element 340 configured for connection to the first chassis rail 303 and a second end frame element 342 configured for connection to the second chassis rail 305. In various embodiments, a central end frame element 344 is configured to extend between and connect to both the first chassis rail 303 and the second chassis rail 305. Without loss of generality, one or more of the first end frame element 340, the second end frame element 342 and the central end frame element 344 may be fabricated using steel, aluminum, or other durable material and have circular or rectangular cross sections or take the form of a truss-like member. For example, as illustrated, both the first end frame element 340 and the second end frame element 342 are constructed using rectangular shaped beam segments, while the central end frame element 344 is constructed using a truss-like member. As further illustrated, each of the first end frame element 340, the second end frame element 342 and the central end frame element 344 may include a flange configured for attachment to the vehicle chassis 304. For example, the first end frame element 340 includes a first flange 346 configured for bolting to the first chassis rail 303 and the second end frame element 342 includes a second flange 348 configured for bolting to the second chassis rail 305. Similarly, the central end frame element 344 includes a third flange 347 configured for bolting to the first chassis rail 303 a second flange 349 configured for bolting to the second chassis rail 305. In various embodiments, the central end frame element 344 may be disposed at the same axial location as both the first end frame element 340 and the second end frame element 342 or may be disposed aft (as illustrated) of the first end frame element 340 and the second end frame element 342, the aft disposition providing room for components of a drive train for the vehicle (e.g., an engine or a transmission). Being able to adjust the location of the central end frame element 344 also enables incorporating a center tank (e.g., the second pressure vessel 332) of various sizes. For example, because the center tank is not rigidly coupled to the outside tanks (e.g., the first pressure vessel 330 and the third pressure vessel 334), the tank design may be shorter, as illustrated, than the outside tanks, or positioned differently than the outside tanks. In various embodiments, the center tank may be the same diameter and length as the outside tanks as well, depending on chassis configuration. In various embodiments, the first end frame 312 may also include a first transverse beam 341 having a first end 343 configured to tie into the first side frame 316 and a second end 345 configured to tie into the second side frame 318.

In various embodiments, the second end frame 314 is constructed in a manner similar to the first end frame 312 and also configured for attachment to the vehicle chassis 304. For example, the second end frame 314 may include a first end frame element 350 configured for connection to the first chassis rail 303, a second end frame element 352 configured for connection to the second chassis rail 305 and a central end frame element 354 configured to extend between and connect to both the first chassis rail 303 and the second chassis rail 305. Attaching the second end frame 314 to the vehicle chassis 304 may also be accomplished in a manner similar to the first end frame 312. For example, as illustrated, the first end frame element 350 includes a first flange 356 configured for bolting to the first chassis rail 303 and the second end frame element 352 includes a second flange 358 configured for bolting to the second chassis rail 305. Similarly, the central end frame element 354 includes a third flange 357 configured for bolting to the first chassis rail 303 and a second flange 359 configured for bolting to the second chassis rail 305. The second end frame 314 may also include a second transverse beam 351 having a first end 353 configured to tie into the first side frame 316 and a second end 355 configured to tie into the second side frame 318. In various embodiments, either or both of the first end frame 312 and the second end frame 314 may also include one or more diagonal members or struts configured to transmit impact loads between the various members that comprise the end frames. For example, as illustrated in FIG. 3B, the second end frame 314 includes a first diagonal member 360 having a first end 361 connected to the central end frame element 354 and a second end 363 connected to the second transverse beam 351. Similarly, the second end frame 314 includes a second diagonal member 364 having a first end 365 connected to the central end frame element 354 and a second end 366 connected to the second transverse beam 351.

Referring still to FIGS. 3A and 3B, the first side frame 316 and the second side frame 318 are illustrated as extending axially between the first end frame 312 and the second end frame 314. For example, the first side frame 316 includes a first end 367 connected to a first impact dissipator 368 and a second end 369 connected to a second impact dissipator 370. The first impact dissipator 368 is also connected to the first end frame element 340 of the first end frame 312 and to the first end 343 of the first transverse beam 341, thereby tying or otherwise connecting the first end 367 of the first side frame 316 to the first end frame 312. Likewise, the second impact dissipator 370 is also connected to the first end frame element 350 of the second end frame 314 and to the first end 353 of the second transverse beam 351, thereby tying or otherwise connecting the second end 369 of the first side frame 316 to the second end frame 314. As illustrated, one or more flanges may, in various embodiments, be used to make the connections of the first side frame 316 to the first end frame 312 and to the second end frame 314. Similarly, the second side frame 318 includes a first end 371 connected to a first impact dissipator 372 and a second end 373 connected to a second impact dissipator 374. The first impact dissipator 372 is also connected to the second end frame element 342 of the first end frame 312 and to the second end 345 of the first transverse beam 341, thereby tying or otherwise connecting the first end 371 of the second side frame 318 to the first end frame 312. Likewise, the second impact dissipator 374 is also connected to the second end frame element 352 of the second end frame 314 and to the second end 355 of the second transverse beam 351, thereby tying or otherwise connecting the second end 373 of the second side frame 318 to the second end frame 314. As illustrated, one or more flanges may, in various embodiments, be used to make the connections of the second side frame 318 to the first end frame 312 and to the second end frame 314. In various embodiments, the first side frame 316 and the second side frame 318 may comprise stiffening features that aid in dissipation of energy upon impact. For example, as illustrated, both the first side frame 316 and the second side frame 318 may include a plurality of slots 375 that are formed by cutting into the structural beams that comprise the side frames. The plurality of slots 375 thereby form stress hardened locations along the length of the beams; or, alternatively, the cuts provide a weight reduction technique. In various embodiments, one or both of the first side frame 316 and the second side frame 318 may be configured to support a cover frame 376 that extends along the length of a pressure vessel. The cover frame 376 may extend about the circumference of the pressure vessel or a portion thereof and support a skin configured to protect the pressure vessel from rocks or ice or other debris.

Referring now to FIGS. 4A, 4B, 4C, 4D and 4E, a pressure vessel 402, similar to the pressure vessel 302 described above with reference to FIGS. 3A and 3B, is illustrated. In various embodiments, the pressure vessel 402 includes a vessel mount 480, disposed at one or both of the first end and the second end of the pressure vessel 402, configured for attachment to an attachment collar, such as, for example, one of the first attachment collar 307 and the second attachment collar 309 described above with reference to FIGS. 3A and 3B. As will become apparent, the vessel mount 480 is configured to prevent the pressure vessel 402 from rotation about a central axis A and enables impact loads within a pressure vessel mounting system (e.g., the pressure vessel mounting system 300 described above) to be transferred into a composite overwrap 479 of the exterior shell of the pressure vessel 402 and dissipated. Beneficially, transferring the impact loads into the composite wrap 479 alleviates loads that might otherwise be imparted against a boss 481, such as, for example, one of the first boss 16 or the second boss 20 described above with reference to FIGS. 1A and 1B.

With further reference to FIGS. 4A-4E, the vessel mount 480 includes a plate 482 configured for attachment to an end of the pressure vessel 402. The plate 482 may include a central orifice through which the boss 481 may extend. In various embodiments, the plate 482 has a curved surface configured to match a curved surface of the portion of the composite overwrap 479 that comprises a dome portion of the pressure vessel 402. The vessel mount 480 further includes a plurality of studs 483 that extend in a generally axial direction from a surface of the plate 482. The plurality of studs 483 typically includes at least two studs spaced diametrically opposite each other on the plate 482, though any number of studs may be employed (e.g., three studs, four studs, five studs, or six studs spaced evenly about the plate 482). In various embodiments, one or more of the plurality of studs 483 may include a first portion 484 that extends substantially normal from a curved surface of the plate 482 and a second portion 485 that extends in a substantially axial direction, thereby facilitating engagement of the plurality of studs 483 with apertures extending within the attachment collar. In various embodiments, a layer 486 of high-friction material may be disposed on a mating surface of the plate 482 to increase the coefficient of friction between the plate 482 and the composite overwrap 479 and to provide abrasion protection between the plate 482 and the composite overwrap 479 due to interlaminar movement from expansion of the pressure vessel 402.

During fabrication of the pressure vessel 402, the vessel mount 480 may be positioned against the composite overwrap 479. A plurality of filament bands 487 (see FIG. 4E) are then applied in helical fashion to the composite overwrap 479 to secure the vessel mount 480 within the dome of the pressure vessel 402 or, more particularly, onto the surface of the composite overwrap 479. In various embodiments, the plurality of filament bands 487 do not contribute substantially to the structural integrity of the composite overwrap 479 and, therefore, may comprise a less costly material, such as, for example, glass fiber. A sufficient number of filament bands 487 are wound across the plate 482 to rigidly secure the vessel mount 480 to the composite overwrap 479, resulting in the vessel mount 480 being permanently integrated into the pressure vessel 402. In various embodiments, the plate 482 is configured to cover a large portion of the surface of the dome of the pressure vessel 402 in order to disperse impact loads about a large portion of the dome. In various embodiments, the plurality of studs 483 may be threaded, welded or otherwise affixed to the plate 482. The plate 482 may be constructed from aluminum, steel, composite, or other suitable structural materials.

Figure 5:
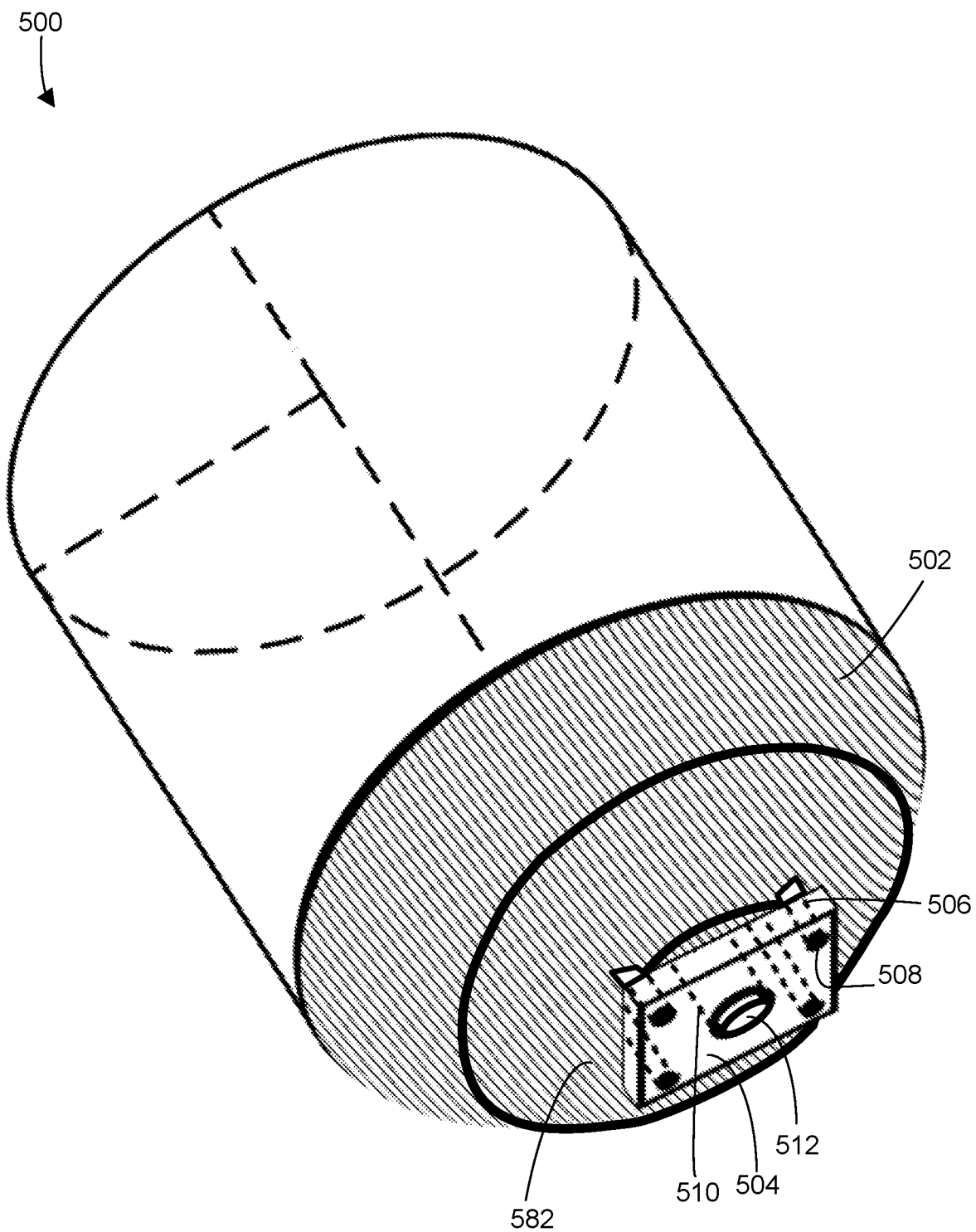
FIG. 5 illustrates a dome-mount system configured to secure a dome section of a pressure vessel to a structural carriage, in accordance with various embodiments.

Referring now to FIG. 5, a dome-mount system 500 for a pressure vessel 502 is illustrated. Dome-mount system 500 is configured for mounting a dome section of a pressure vessel 502 to a structural carriage of a pressure vessel mounting system. In accordance with various embodiments, the dome-mount system 500 includes an attachment collar 504, similar to either of the first attachment collar 307 or the second attachment collar 309 described above with reference to FIGS. 3A and 3B. The attachment collar 504 includes a plurality of apertures 506 configured to slidably receive a plurality of studs 508, similar to the plurality of studs 483 described above with reference to FIGS. 4A-4E. Slidable disposition of the plurality of studs 508 within the plurality of apertures enables axial expansion of the pressure vessel 502 in response to pressure and temperature variations of the gas within the pressure vessel 502. The attachment collar 504 further includes a boss aperture 510 configured to slidably receive a boss 512, similar to the boss 481 described above with reference to FIGS. 4A-4E.

In various embodiments, the attachment collar 504 is configured for attachment to a frame of a pressure vessel mounting system, such as, for example, the pressure vessel mounting system 300 described above with reference to FIGS. 3A and 3B. As illustrated in FIGS. 3A and 3B, for example, the first attachment collar 307 is connected to the second end frame element 342 and to the second end 345 of the first transverse beam 341, thereby securing the first attachment collar 307 to the first end frame 312 of the structural carriage 310. Similarly, the second attachment collar 309 is connected to the second end frame element 352 and to the second end 355 of the second transverse beam 351, thereby securing the second attachment collar 309 to the second end frame 315 of the structural carriage 310. The configuration just described slidably secures the pressure vessel 302 within the structural carriage 310, enabling axial expansion of the pressure vessel 302 in response to pressure and temperature variations of the gas within the pressure vessel 302 as described above. As illustrated, similar configurations may be used for each of the pressure vessels (e.g., the first pressure vessel 330, the second pressure vessel 332 and the third pressure vessel 334) carried by the structural carriage 310.

Figure 6:
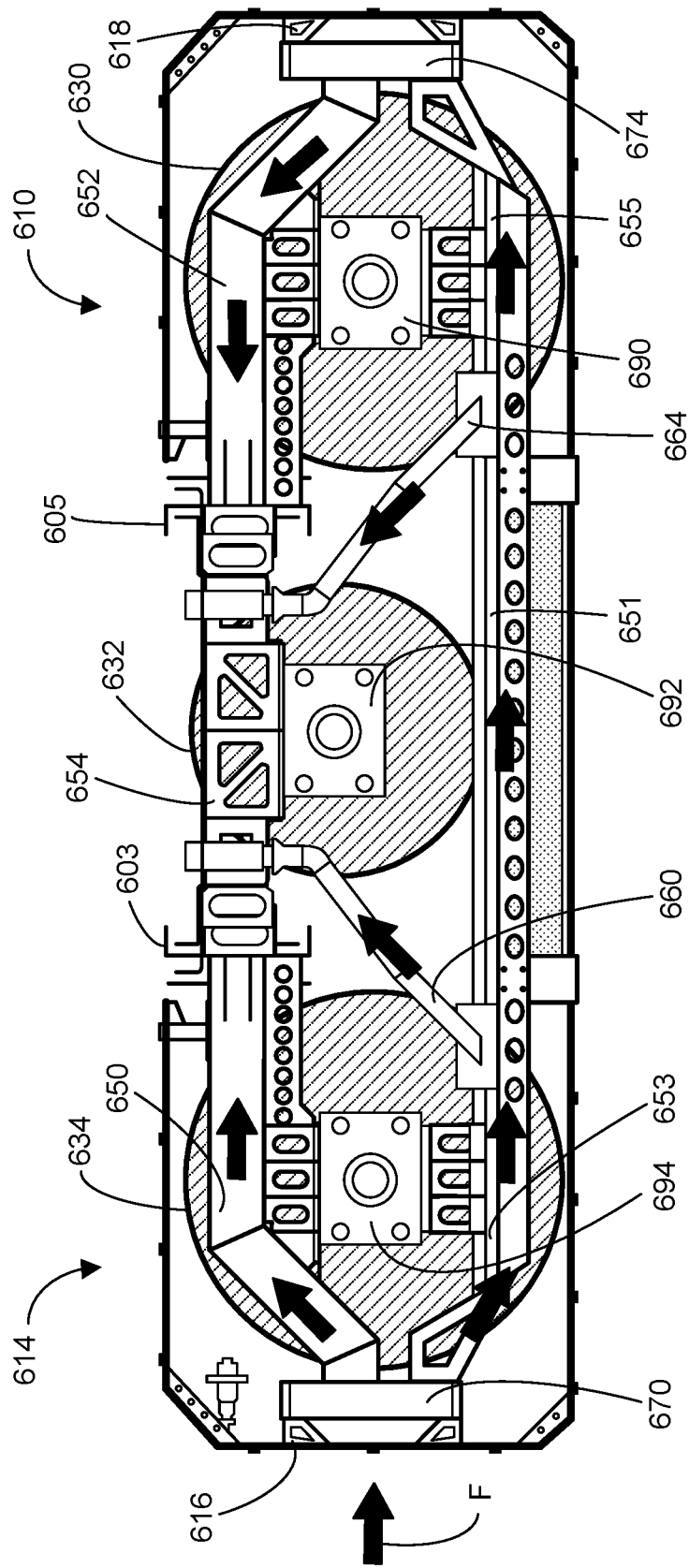
FIG. 6 illustrates a load distribution diagram through an end frame of a structural carriage, in accordance with various embodiments.

Referring now to FIG. 6, in accordance with various embodiments, a diagram illustrating a load distribution within an end frame 614 of a structural carriage 610 in response to an impact load is illustrated. For purposes of illustration and description, the end frame 614 may be considered the second end frame 314 of the structural carriage 310 described above with reference to FIGS. 3A and 3B. Similar to the previous discussion with reference to FIGS. 3A and 3B, the end frame 614 includes a first end frame element 650 connected to a first chassis rail 603, a second end frame element 652 connected to a second chassis rail 605 and a central end frame element 654 extending between and connected to both the first chassis rail 603 and the second chassis rail 605. A transverse beam 651 includes a first end 653 connected to a first side frame 616 and a second end 655 connected to a second side frame 618. A first diagonal member 660 and a second diagonal member 664 extend between the central end frame element 654 and the transverse beam 651. A first impact dissipator 670 is disposed between and connected to the first side frame 616 and the first end frame element 650 and the first end 653 of the transverse beam 651. A second impact dissipator 674 is disposed between and connected to the second side frame 618 and the second end frame element 652 and the second end 655 of the transverse beam 651.

Upon impact directed at the first side frame 616, which is typically the first point of contact during a side-impact crash scenario, a resulting impact load F is initially dissipated over the length of the first side frame 616 and is directed into the first impact dissipator 670 where a portion of the impact load F is absorbed and dissipated. The impact load F (or the portion thereof not dissipated by the first side frame 616 and the first impact dissipator 670) is also directed into the second impact dissipator 674 where a subsequent portion of the impact load F is absorbed and dissipated. As illustrated, at the same time the first impact dissipator 670 and the second impact dissipator 674 are absorbing and dissipating the impact load F, various portions of the impact load F are being transmitted through and absorbed and dissipated by deformation of the first end frame element 650, the second end frame element 652, the transverse beam 651 and the first diagonal member 660 and the second diagonal member 664. Absorption and dissipation of the impact load F also occurs through deformation of the central end frame element 654 and the first chassis rail 603 and the second chassis rail 605. The collective absorption and dissipation of the impact load F from each of the components just described serves to minimize movement of the pressure vessels (e.g., a first pressure vessel 630, a second pressure vessel 632 and a third pressure vessel 634) via minimizing movement of the corresponding attachment collars (e.g., a first attachment collar 690, a second attachment collar 692 and a third attachment collar 694) to which the pressure vessels are attached.

Figure 7:
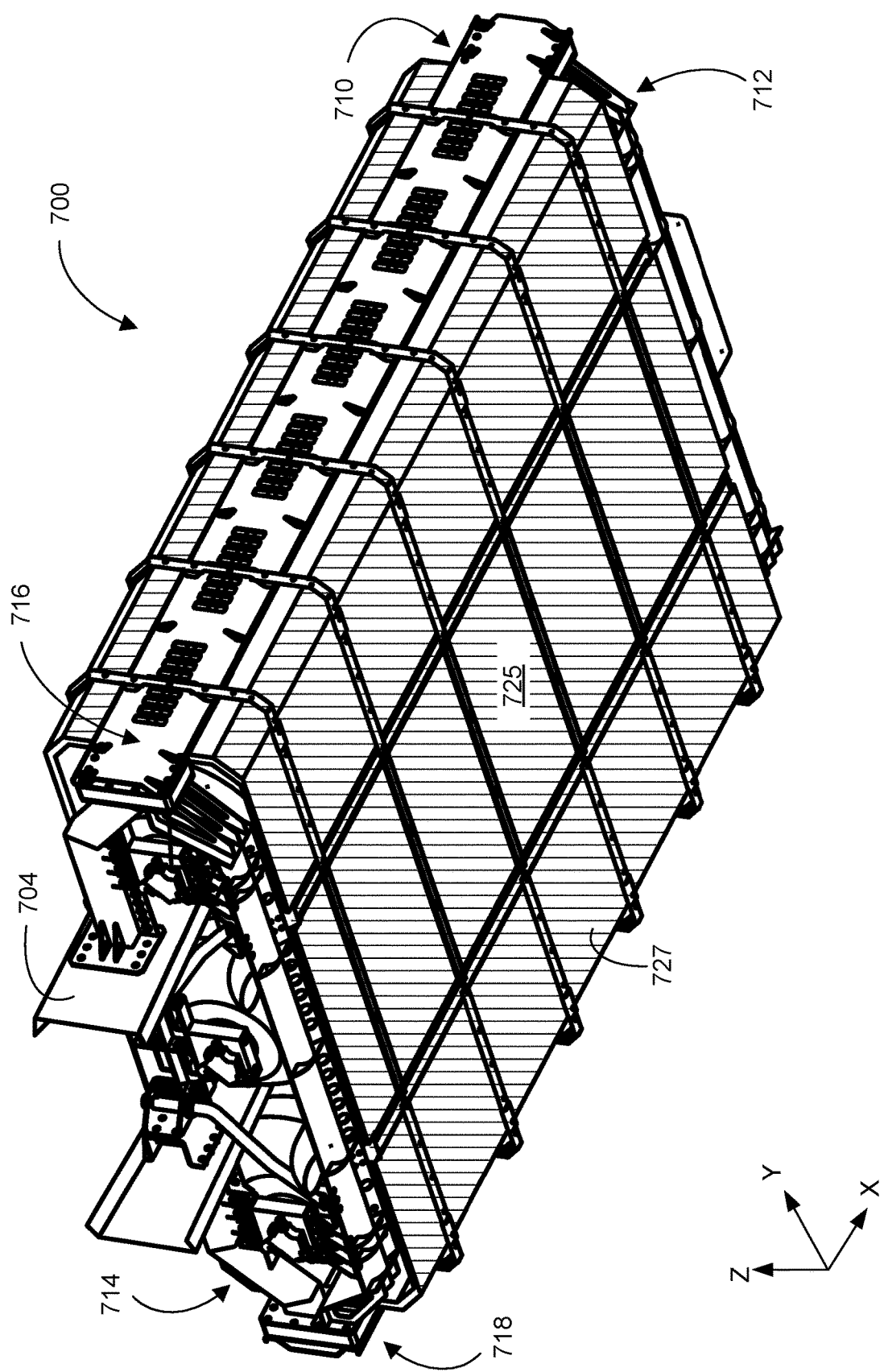
FIG. 7 illustrates a pressure vessel mounting system wrapped by a heat shield, in accordance with various embodiments.

Referring now to FIG. 7, a pressure vessel mounting system 700 is illustrated, in accordance with various embodiments. The pressure vessel mounting system 700 is similar to other embodiments described in this disclosure, including, for example, the pressure vessel mounting system 300 described above with reference to FIGS. 3A and 3B. In various embodiments, for example, the pressure vessel mounting system 700 is configured to carry one or more pressure vessels and includes a structural carriage 710 configured for mounting to a vehicle chassis 704 and absorbing energy through controlled deformation upon impact. In various embodiments, the structural carriage 710 includes a first end frame 712 (or a front frame), a second end frame 714 (or a rear frame) spaced a longitudinal distance in the X-direction from the first end frame 712, a first side frame 716 (or a left side frame) and a second side frame 718 (or a right side frame) spaced a transverse distance along the Y-direction from the first side frame 716. Other components of the structural carriage 710 are similar to those described above and, therefore, are not detailed again here.

Still referring to FIG. 7, the pressure vessel mounting system 700 includes an integrated thermal protection system 725. In various embodiments, the integrated thermal protection system 725 provides a flame barrier or high temperature thermal insulation configured to reduce or otherwise eliminate direct contact of flame with the one or more pressure vessels. The integrated thermal protection system 725 also functions to reduce the temperature (e.g., the flame temperature of a gasoline combusting with atmospheric air) that the one or more pressure vessels may be exposed to during or following a crash scenario. In various embodiments, the integrated thermal protection system 725 comprises a heat shield 727 configured to wrap around the one or more pressure vessels by wrapping around the structural carriage 710. For example, as illustrated, the heat shield 727 may be configured to extend laterally between the first end frame 712 and the second end frame 714 and between the first side frame 716 and the second side frame 718, both on the top and the bottom regions or surfaces of the structural carriage 710. In various embodiments, the heat shield 727 may also extend or be provided at the front and the back of the structural carriage 710 so as to provide complete or near-complete enclosure of the one or more pressure vessels.

Figure 8:
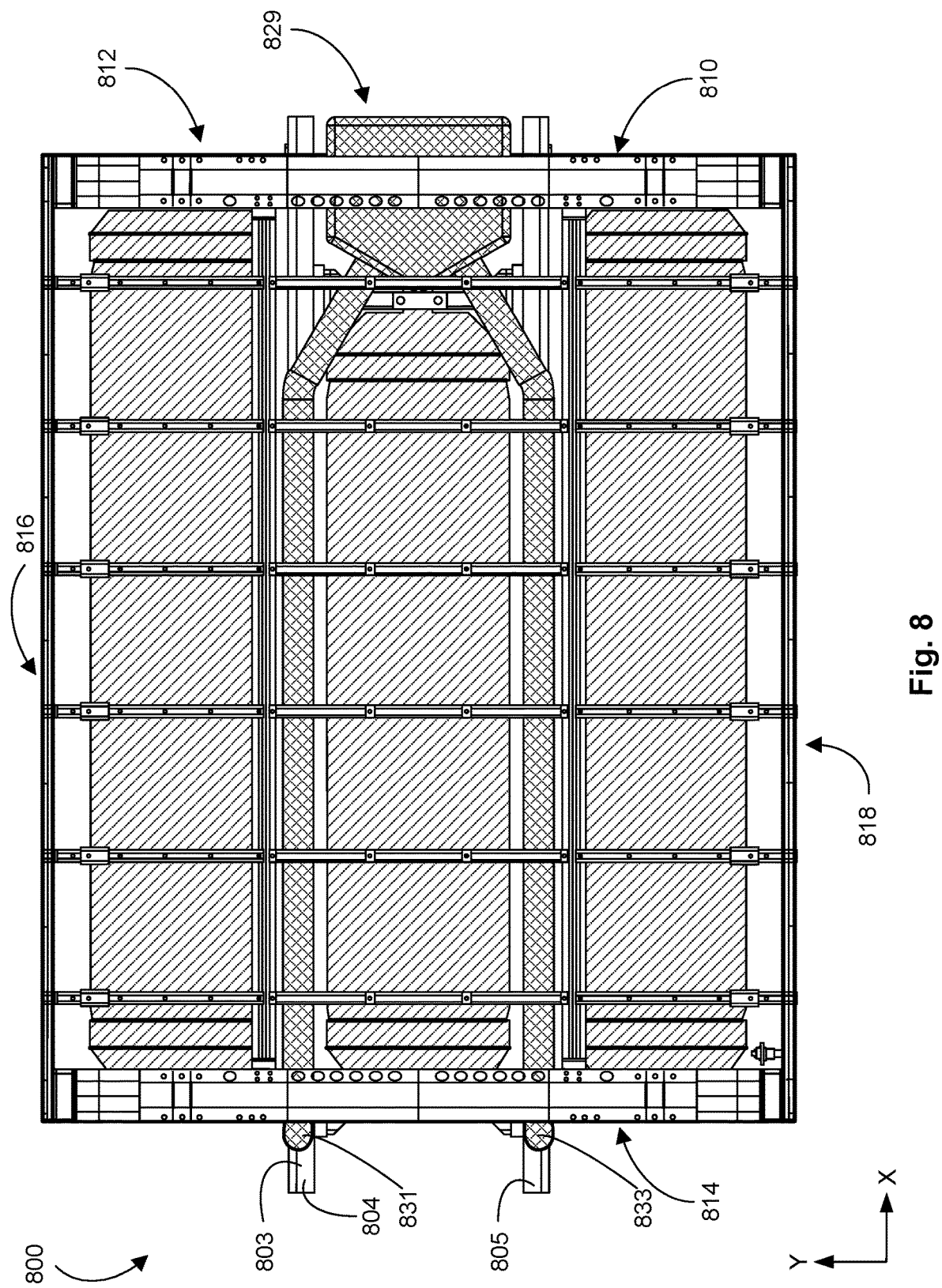
FIG. 8 illustrates a fuel cell exhaust system routed within a pressure vessel mounting system, in accordance with various embodiments.

Referring now to FIG. 8, a pressure vessel mounting system 800 is illustrated, in accordance with various embodiments. The pressure vessel mounting system 800 is similar to other embodiments described in this disclosure, including, for example, the pressure vessel mounting system 300 described above with reference to FIGS. 3A and 3B. In various embodiments, for example, the pressure vessel mounting system 800 is configured to carry one or more pressure vessels and includes a structural carriage 810 configured for mounting to a vehicle chassis 804 and absorbing energy through controlled deformation upon impact. In various embodiments, the structural carriage 810 includes a first end frame 812 (or a front frame), a second end frame 814 (or a rear frame) spaced a longitudinal distance in the X-direction from the first end frame 812, a first side frame 816 (or a left side frame) and a second side frame 818 (or a right side frame) spaced a transverse distance along the Y-direction from the first side frame 816. Other components of the structural carriage 810 are similar to those described above and, therefore, are not detailed again here.

Still referring to FIG. 8, the pressure vessel mounting system 800 includes or supports a fuel cell exhaust system 829. In various embodiments, the fuel cell exhaust system 829 includes a first exhaust conduit 831 configured to run along a first chassis rail 803 of the vehicle chassis 804. Similarly, in various embodiments, the fuel cell exhaust system 829 includes a second exhaust conduit 833 configured to run along a second chassis rail 805 of the vehicle chassis 804. The fuel cell exhaust system 829 improves safety by routing exhaust via one or both of the first exhaust conduit 831 and the second exhaust conduit 833 toward the rear of the vehicle and away from vehicle batteries, electronics and the operator. As the structural carriage 810 imparts increased stiffness to the vehicle chassis 804, the fuel cell exhaust system 829 (including one or both of the first exhaust conduit 831 and the second exhaust conduit 833) may be mounted using fewer joints or flexible elements, such as, for example, bellows. In addition, in various embodiments, the fuel cell exhaust system 829 (including one or both of the first exhaust conduit 831 and the second exhaust conduit 833) may impart additional stiffness or structural integrity to the structural carriage 810 by using high-stiffness materials or channel-like components to construct the fuel cell exhaust system 829 and, particularly, one or both of the first exhaust conduit 831 and the second exhaust conduit 833.

Principles of the present disclosure may be utilized in connection with various fuel cell electric vehicles, for example as disclosed in U.S. Pat. No. 10,077,084 entitled SYSTEMS, METHODS, AND DEVICES FOR AN AUTOMOBILE DOOR OR WINDOW, and/or U.S. Pat. No. 10,981,609 entitled SYSTEMS, METHODS, AND DEVICES FOR AN AUTOMOBILE DOOR OR WIN- DOW. The contents of each of the foregoing are hereby incorporated in their entirety for all purposes (except for any subject matter disclaimers or disavowals, and except to the extent of any conflict with the disclosure of the present application, in which case the disclosure of the present application shall control).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A pressure vessel mounting system for mounting a pressure vessel to a vehicle chassis, the system comprising:
   a first end frame including a first end frame element and an attachment collar configured to receive a vessel mount of the pressure vessel;
   a second end frame spaced a distance from the first end frame, the distance being sufficient to receive the pressure vessel between the first end frame and the second end frame;
   a first side frame extending between the first end frame and the second end frame, the first side frame coupled to a first chassis rail of the vehicle chassis via the first end frame element;
   a second side frame extending between the first end frame and the second end frame; and
   a first impact dissipator coupled directly to the first end frame element and the first side frame, wherein the first impact dissipator comprises one of an aluminum honeycomb or a fluid filled elastomeric material.

2. The pressure vessel mounting system of claim 1, wherein the first end frame includes a second end frame element configured to couple the second side frame to a second chassis rail.

3. The pressure vessel mounting system of claim 1, further comprising a transverse beam extending between the first side frame and the second side frame, the transverse beam having a first end connected to the first impact dissipator.

4. The pressure vessel mounting system of claim 3, further comprising a second impact dissipator disposed between the second side frame and a second end of the transverse beam.

5. The pressure vessel mounting system of claim 4, further comprising a diagonal member connected to the transverse beam and to a central end frame element extending between the first chassis rail and a second chassis rail.

6. The pressure vessel mounting system of claim 2, further comprising a central end frame element extending between the first end frame element and the second end frame element.

7. The pressure vessel mounting system of claim 6, wherein the central end frame element is connected to the first chassis rail and to the second chassis rail.

8. The pressure vessel mounting system of claim 7, wherein a diagonal member extends between and is connected to the central end frame element and a transverse beam extending between the first side frame and the second side frame.

9. The pressure vessel mounting system of claim 1, wherein the attachment collar is configured to receive the vessel mount secured to a dome of the pressure vessel, the vessel mount including a plurality of studs.

10. The pressure vessel of claim 9, wherein the attachment collar includes a plurality of apertures configured to slidably receive the plurality of studs.

11. A system configured to mount a pressure vessel to a vehicle chassis, the system comprising:
    a first end frame comprising an attachment collar configured to receive a pressure mount of the pressure vessel, the first end frame configured to connect a first side frame to a first chassis rail of the vehicle chassis; and
    a first impact dissipator coupled directly to a first end frame element of the first end frame and the first side frame, wherein the first impact dissipator comprises at least one of an aluminum honeycomb or a fluid filled elastomeric material.

12. The system of claim 11, further comprising a transverse beam configured to extend between the first side frame and a second side frame, the transverse beam having a first end configured for connection to the first impact dissipator.

13. The system of claim 12, further comprising a second impact dissipator configured for disposition between the second side frame and a second end of the transverse beam.

14. The system of claim 13, further comprising a second end frame element configured to connect the second side frame to a second chassis rail of the vehicle chassis.

15. The system of claim 14, further comprising a central end frame element configured to extend between the first chassis rail and the second chassis rail.

* * * * *